United States Patent
Cyrille et al.

(10) Patent No.: US 7,367,110 B2
(45) Date of Patent: May 6, 2008

(54) METHOD OF FABRICATING A READ HEAD HAVING SHAPED READ SENSOR-BIASING LAYER JUNCTIONS USING PARTIAL MILLING

(75) Inventors: Marie-Claire Cyrille, San Jose, CA (US); Wipul Pemsiri Jayasekara, Los Gatos, CA (US); Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 439 days.

(21) Appl. No.: 10/952,427

(22) Filed: Sep. 27, 2004

(65) Prior Publication Data

US 2006/0067009 A1 Mar. 30, 2006

(51) Int. Cl.
*G11B 5/187* (2006.01)
(52) U.S. Cl. ............... 29/603.12; 29/603.14; 29/603.15; 29/603.16; 29/603.18; 204/132.34; 427/128; 427/131; 360/313; 360/324.1
(58) Field of Classification Search ............ 29/603.08, 29/603.12, 603.14, 603.15, 603.16, 603.18; 427/128, 131; 360/313, 314, 315, 324, 324.1, 360/324.11, 324.12, 324.2; 204/192.34
See application file for complete search history.

(56) References Cited

U.S. PATENT DOCUMENTS

| | | | |
|---|---|---|---|
| 4,128,765 A | 12/1978 | Franks | 250/442 |
| 4,869,780 A | 9/1989 | Yang et al. | 156/643 |
| 5,223,109 A | 6/1993 | Itoh et al. | 204/192.34 |
| 5,640,754 A | 6/1997 | Lazzari et al. | 29/603.14 |
| 5,729,410 A | 3/1998 | Fontana, Jr. et al. | 360/113 |
| 5,966,012 A | 10/1999 | Parkin | 324/252 |
| 5,991,193 A | 11/1999 | Gallagher et al. | 365/171 |
| 6,034,847 A | 3/2000 | Komuro et al. | 360/126 |
| 6,061,211 A | 5/2000 | Yoda et al. | 360/113 |
| 6,064,552 A | 5/2000 | Iwasaki et al. | 360/113 |
| 6,198,119 B1 | 3/2001 | Nabatame et al. | 257/295 |
| 6,198,608 B1 * | 3/2001 | Hong et al. | 360/324.12 X |
| 6,223,420 B1 | 5/2001 | Lee et al. | 29/603.14 |
| 6,292,335 B1 | 9/2001 | Gill | 360/324.11 |
| 6,322,640 B1 * | 11/2001 | Xiao et al. | 29/603.08 X |
| 6,329,078 B1 | 12/2001 | Tsuge | 428/678 |
| 6,330,136 B1 | 12/2001 | Wang et al. | |
| 6,424,508 B1 | 7/2002 | Tadokoro et al. | 360/324.2 |

(Continued)

FOREIGN PATENT DOCUMENTS

JP 6-274838 * 9/1994

*Primary Examiner*—A. Dexter Tugbang
(74) *Attorney, Agent, or Firm*—Patent Law Office of Larry Guernsey; Larry B. Guernsey (57) ABSTRACT

A method for fabricating a read head for a magnetic disk drive having a read head sensor and a hard bias layer, where the read head has a shaped junction between the read head sensor and the hard bias layer. The method includes providing a layered wafer stack to be shaped. A single- or multi-layered photoresist mask having no undercut is deposited upon the layered wafer stack to be shaped. The layered wafer stack is shaped by the output of a milling source, where the shaping includes partial milling to within a partial milling range to form a shaped junction. A hard bias layer is then deposited which is in contact with the shaped junction of the wafer stack.

12 Claims, 7 Drawing Sheets

U.S. PATENT DOCUMENTS

| | | |
|---|---|---|
| 6,526,649 B2 | 3/2003 | Ohkawara ................ 29/603.07 |
| 6,600,314 B2 | 7/2003 | Kou ........................... 324/252 |
| 6,641,705 B2 | 11/2003 | Phaneuf et al. ........ 204/192.34 |
| 6,694,604 B2 | 2/2004 | Santini .................... 29/603.14 |
| 6,700,759 B1 * | 3/2004 | Knapp et al. ............ 360/324.2 |
| 6,721,149 B1 | 4/2004 | Shi et al. ................. 360/324.2 |
| 6,729,015 B2 | 5/2004 | Matono et al. .......... 29/603.18 |
| 6,734,671 B2 | 5/2004 | Murata et al. .............. 324/252 |
| 6,735,850 B1 | 5/2004 | Gibbons et al. ......... 29/603.07 |
| 6,741,429 B1 | 5/2004 | Baglin et al. ............. 360/313 |
| 6,833,979 B1 | 12/2004 | Knapp et al. |
| 6,989,971 B2 | 1/2006 | Lin et al. |
| 2001/0055185 A1 | 12/2001 | Ooshima et al. ........ 360/324.11 |
| 2002/0017018 A1 | 2/2002 | Ohkawara ................ 29/603.18 |
| 2002/0093773 A1 * | 7/2002 | Pinarbasi ............. 360/324.1 X |
| 2002/0148105 A1 | 10/2002 | Han et al. ................ 29/603.14 |
| 2002/0154458 A1 | 10/2002 | Lin et al. ................ 360/324.12 |
| 2003/0009233 A1 | 1/2003 | Blinn et al. ............... 623/22.11 |
| 2003/0053268 A1 | 3/2003 | Lin et al. .................. 360/324.1 |
| 2003/0093894 A1 | 5/2003 | Dugas et al. ............. 29/603.15 |
| 2003/0182790 A1 | 10/2003 | Hsiao et al. ............. 29/603.15 |
| 2004/0052005 A1 | 3/2004 | Zolla et al. |

* cited by examiner

METHOD OF FABRICATING A READ HEAD HAVING SHAPED READ SENSOR-BIASING LAYER JUNCTIONS USING PARTIAL MILLING

BACKGROUND OF THE INVENTION

1. Field of the Invention

The present invention relates generally to fabrication of electronic components, and more particularly, this invention relates to shaping of the junction between a hard biasing layer and the free layer of a magnetic read sensor of a hard disk drive.

2. Description of the Prior Art

In recent years there has been a constant drive to increase the performance of hard disk drives by increasing the areal data storage density of the magnetic hard disk. This is done by reducing the written data track width, such that more tracks per inch can be written on the disk. This naturally requires that the width of the read head be reduced so magnetic field interference from adjacent data tracks is not picked up. Read sensors, of which one type is referred to as a "spin valve", developed to read trackwidths smaller than 130 nm depends upon the ability to ion mill the sensor to these very small dimensions, and to reliably lift-off the deposited layer materials.

Figure 5:
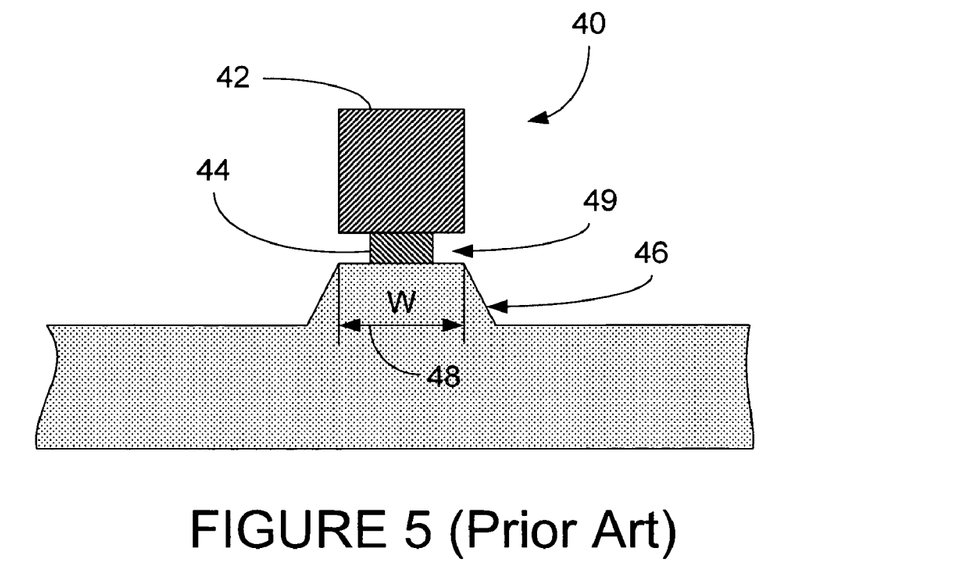
FIG. 5 is a front plan view of the structure of a CIP read sensor of the prior art as seen from the ABS.

One method used in the prior art for milling the read sensors is shown in FIG. 5 (Prior art). Preferably a single mill step at high incidence angle (0 to 15 degrees from normal incidence, i.e., perpendicular to the plane of the surface being milled) is used in conjunction with a 2-layer photoresist mask 40, having an upper layer 42 and a lower layer 44 to shape the read sensor 46. Commonly, the lower layer 44 of the 2-layer photoresist mask 40 is of a narrower dimension than upper layer 42 and of the trackwidth W 48 to form an undercut 49.

However, the limits of this technique are being reached because with trackwidths less than 130 nm, the width of the photoresist lower layer 44 becomes too small to support the upper layer 42. In response, techniques are being developed to use a photoresist mask which has no undercut. A single layer of photoresist or a multilayer structure can be used with no undercut formed.

After the read sensor or spin valve is completed, layers are deposited on both sides of the sensor. These generally include a seed layer, a stabilizing or hard bias layer and a layer of electrical leads. The junctions where these layers meet the layers of the spin valve sensor are very crucial to performance of the disk drive. For advanced spin valve read sensors used in magnetic recording heads, the hard bias to spin valve junction shape is especially critical. Different sensor designs and head designs call for various junction shapes. It is very desirable to vary the junction profile, and thus to affect the sharpness of the free layer edges, sharpness of the pinned layer edges, and the material on which the hard bias layers are grown, hence affecting device performance.

Figure 6:
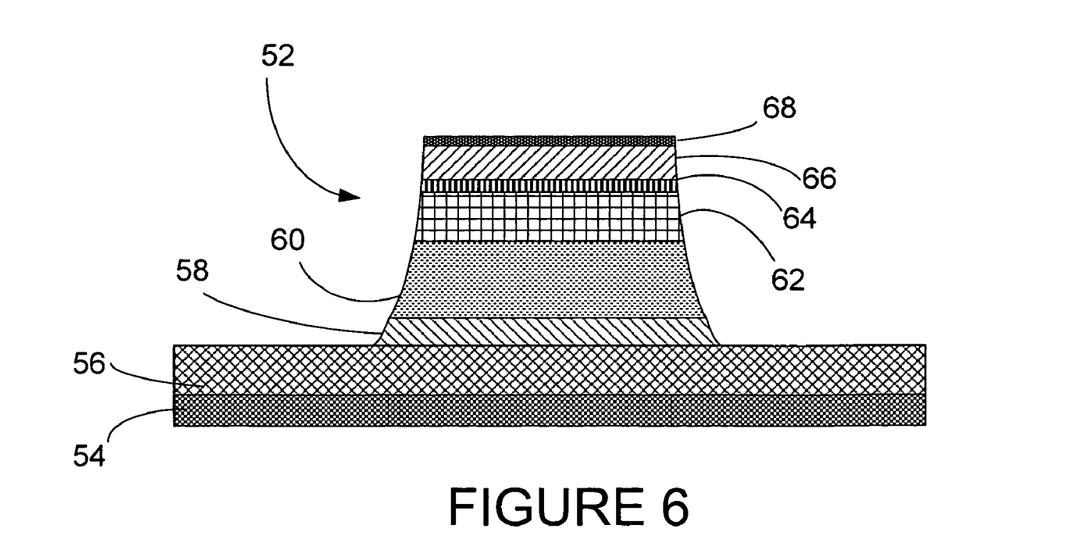
FIG. 6 is a front plan view of the structure of a CIP read sensor having complete milling as seen from the ABS.

Referring now to FIG. 6, the stack of layers, referred to generally as a wafer stack 52, typically includes a first shield layer 54, a dielectric gap layer 56 and a first seed layer 58, upon which the remainder of the stack 60-68 is built. The milling or shaping process has typically involved cutting through the upper stack layers, completely through the first seed layer to reach the dielectric gap layer. It has been discovered that there are several disadvantages to this "complete milling" and many advantages to a "partial milling" operation in which some layers of sensor stack are left behind after the patterning operation, retaining a thin layer of material which covers the dielectric layer. In particular, when using complete milling, the thin dielectric layer underneath the sensor may become damaged by ion milling. This decreases manufacturing yields since there is more yield loss due to shorting between the sensor and the bottom shield. Secondly, the amount of material removed with complete milling is greater. There is thus more redeposited material that gets thrown against the sensor during milling processes. This is expected to give less clean junctions, with higher junction resistance. Also, the total milling time is naturally longer, and consequently, there is more chance of ESD damage.

Another disadvantage of complete milling is that at the end of the milling process, there are typically islands of patterned material left behind, rather than a continuous film of material on the wafer at all times, as there is with partial milling. Thus, there is more chance of charge buildup and potential ESD damage with complete milling.

Additionally, with partial milling, it is possible to stop at different points of the sensor stack (e.g. pinned layer), and achieve junctions of different shapes. Depending on the sensor film characteristics and hard bias/leads characteristics, this is expected to produce different sensor performance based on junction shape.

Also, it is an advantage that only a thin seed layer for the hard bias is required in the partial mill case. In contrast for the complete mill, a thick seed layer may be required in order to align the hard bias with the free layer. When depositing this thick layer, the amount of material deposited on the junction is significant. This can potentially increase junction resistance, and also leads to a larger spacing between the hard bias layer and the sensor, which is undesirable.

Thus, there is a need for shaped junctions and a method for achieving such junction shapes in spin valve sensors where the junction is achieved by partially milling through the sensor stack.

SUMMARY OF THE INVENTION

The present invention includes a method for fabricating a read head for a magnetic disk drive having a read head sensor and a hard bias layer, where the read head has a shaped junction between the read head sensor and the hard bias layer. The method includes providing a layered wafer stack to be shaped, where the layered wafer stack includes a first seed layer. A single- or multi-layered photoresist mask having no undercut is deposited upon the layered wafer stack to be shaped. A milling source is provided which produces an output at a defined angle of projection, and the angle of said layered wafer stack to be shaped is adjusted relative to the angle of projection of the milling source. The layered wafer stack is shaped by the output of the milling source, where the shaping includes partial milling to within a partial milling range to form a shaped junction. The partial milling range preferably extends from below the free layer to a partial milling depth having a depth endpoint which lies within said first seed layer. A hard bias layer is then deposited which is in contact with the shaped junction of the wafer stack.

A read head produced by this process, and a hard disk drive having a read head produced by this process are also disclosed.

It is an advantage of the present invention that the thin dielectric layer underneath the sensor does not get damaged by ion milling.

It is another advantage of the present invention that manufacturing yields are improved since there are less yield losses due to shorting between the sensor and the bottom shield.

It is yet another advantage of the present invention that the amount of material removed is less, and therefore there is less redeposited material that gets thrown against the sensor, thus producing cleaner junctions, with potentially lower junction resistance.

It is a further advantage of the present invention that the total mill time is shorter, and thus there is less chance of Electrostatic Discharge (ESD) damage.

It is a yet further advantage of the present invention that since the metal is not completely removed during a partial mill, islands of material are not left behind (unlike in the full mill case, where at the end of the milling process, there are islands of patterned material): rather, there is a continuous film of material on the wafer at all times, and thus there is less chance of charge buildup and potential ESD damage.

It is still another advantage of the present invention that it is possible to stop at different points of the sensor stack (e.g. pinned layer), and achieve junctions of different shapes. Depending on the sensor film characteristics and hard bias/leads characteristics, this allows different sensor performance based on junction shape.

It is an additional advantage of the present invention that only a thin seed layer is required for the hard bias where partial milling is performed. In contrast, where full milling is performed, a thick seed layer maybe required in order to align the hard bias with the free layer. When depositing this thick layer, the amount of material deposited on the junction is significant, which could potentially increase junction resistance, and also leads to a larger spacing between the hard bias layer and the sensor, which is undesirable.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

The present invention is a disk drive read head having partial milling of the sensor layers above the dielectric layer, and a method for producing this read head.

Figure 1:
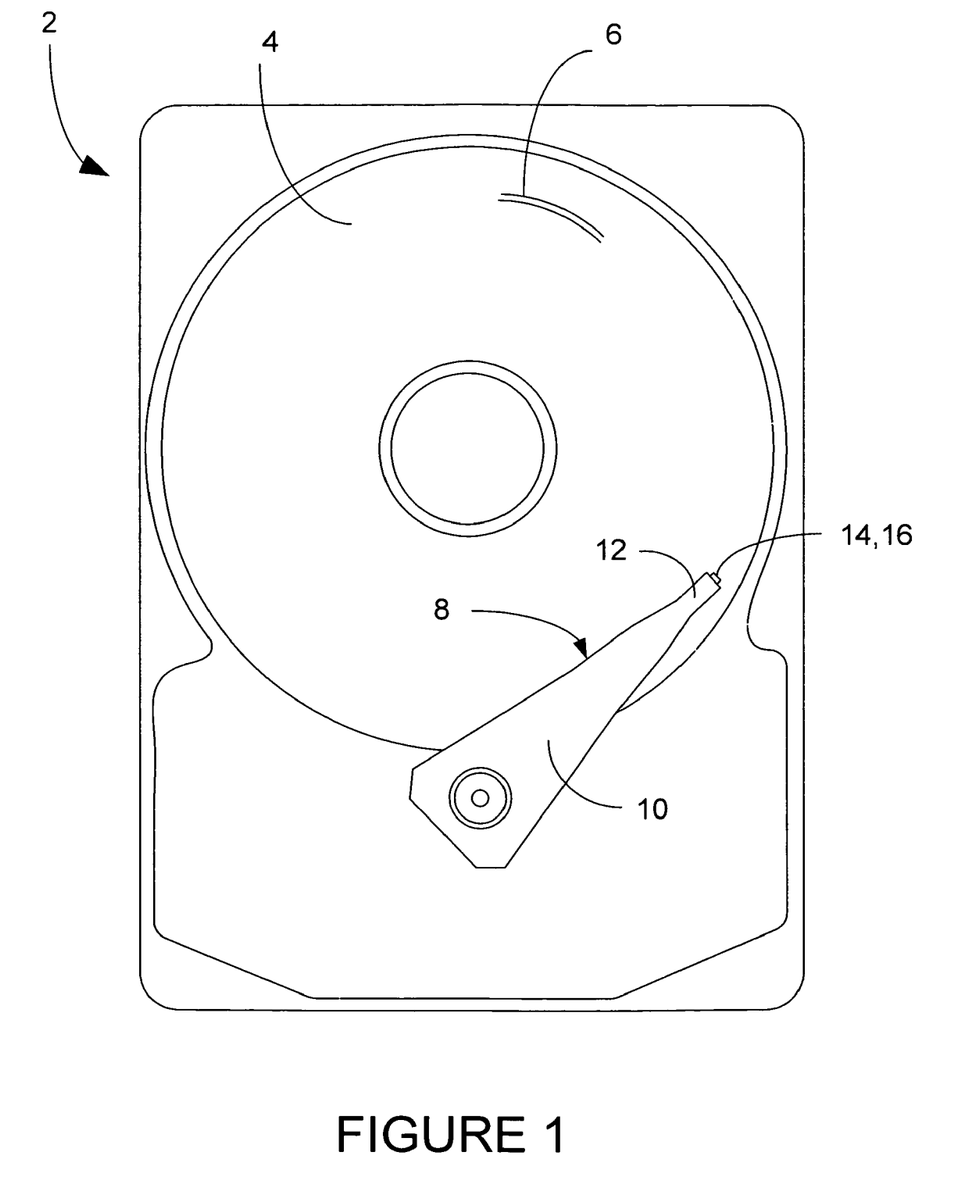
FIG. 1 shows a top plan view of an exemplary disk drive.

A hard disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
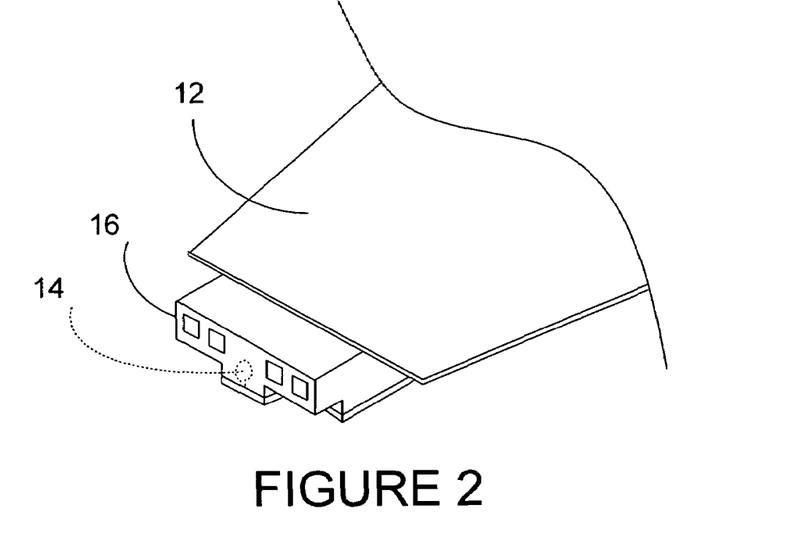
FIG. 2 illustrates a perspective view of view of an exemplary slider and suspension.

FIG. 2 shows a slider 16 in more detail being supported by suspension 12. The magnetic head 14 is shown in dashed lines, and in more detail in FIGS. 3 and 4. The magnetic head 14 includes a coil 18 and P1 pole, which also acts as S2 shield, thus making P1/S2 20. P1 S2 may also be made as two discrete layers. The second pole P2 22 is separated from P1/S2 by write gap 23.

Figure 3:
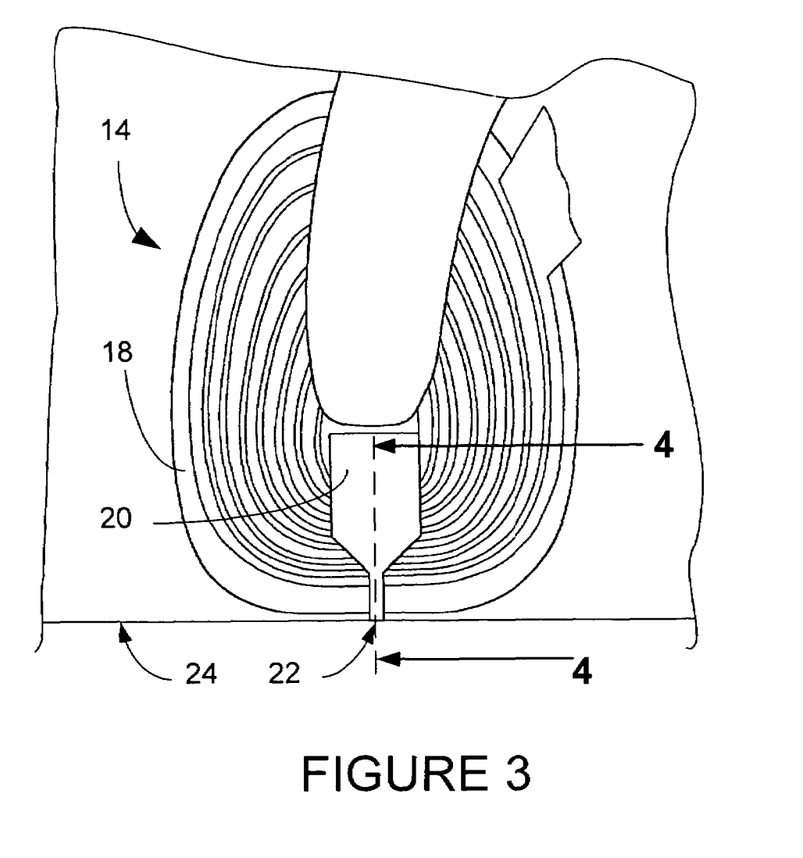
FIG. 3 shows a top plan view of an exemplary read/write head.
Figure 4:
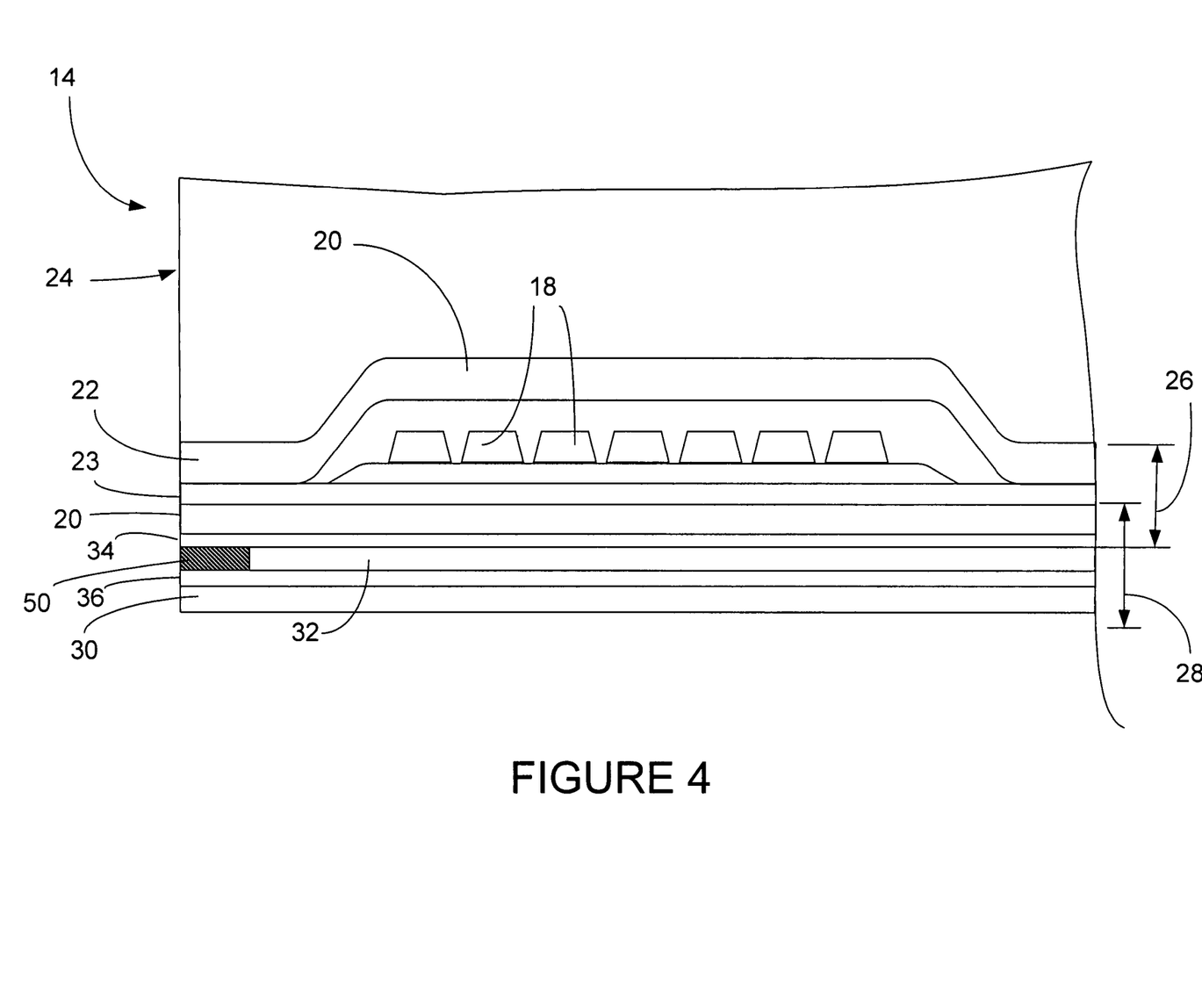
FIG. 4 is a cross-section view of an exemplary read/write head.

The read sensor 50 is sandwiched between the first shield S1 30 and the second shield P1/S2 20. There is generally included an insulation layer 32 between the rest of the length of S1 30 and P1/S2 20. The magnetic head 14 flies on an air cushion between the surface of the disk 4 and the air bearing surface (ABS) 24 of the slider 16. The write head portion 26 and the read head portion 28 are generally shown, with the read head sensor 50 and the ABS 24.

There are two configurations of read head in common use in the industry today. These are called Current Perpendicular to the Plane (CPP), and Current In the Plane (CIP). In the CPP configuration, Shield S1 and P1/S2 are made of conducting material which act as electrodes supplying current to the read sensor which lies between them.

The present invention uses a CIP configuration, in which the current flows from side to side through the elements. For CIP read heads, the read sensor 50 is generally sandwiched between two insulation layers, usually designated G1 34 and G2 36 which are made of non-conductive material, to keep the circuit from shorting out. For the purposes of this discussion, the read head will be considered to be in CIP configuration.

Figure 7:
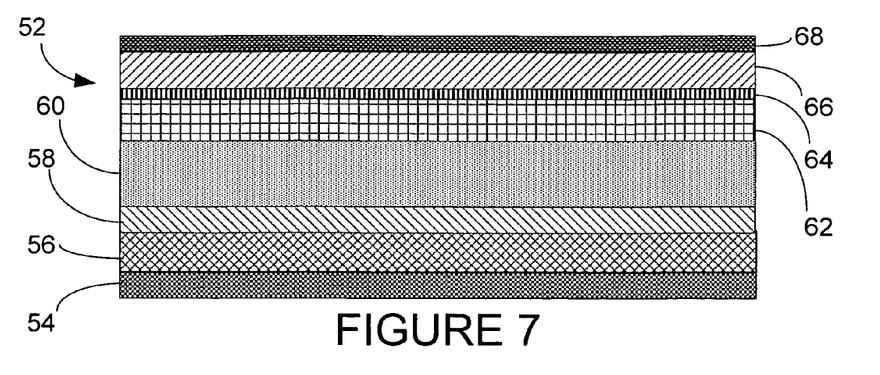
FIGS. 7-12 are front plan views of stages in the construction of a CIP read sensor having partial milling of the present invention as seen from the ABS.

The wafer stack 52 which will be shaped into a CIP (Current In the Plane) read head sensor 50 of the present invention is constructed as shown in FIG. 7, which is a front plan view as seen from the Air Bearing Surface (ABS). The layers of a CIP read head are generally the same as shown in FIG. 7, and a side cross-section view of a finished read head would look very much like FIG. 7. However, FIG. 7 will be assumed to be a view of a wafer stack 52 as seen from the Air Bearing Surface (ABS) before it is shaped into a read head. The stack includes a first magnetic shield 54, corresponding to S1 in the previous discussion, typically of NiFe, fabricated on a substrate (not shown). A dielectric gap layer 56 is formed on the magnetic shield 54. A first seed layer 58 is deposited upon the dielectric gap layer 56. Further layers are formed on top of the layers below, typically in the order of an antiferromagnetic layer 60, a pinned layer 62, a spacer layer 64, a free magnetic layer 66, and a cap layer 68. The spacer layer 64 may include Cu, Ru, etc. and the free layer 66 may include CoFe, NiFe, Co, etc. The cap layer 68 may include Ta.

Note that this structure is strictly for illustration only, and one skilled in the art will appreciate that sensor structures can vary dramatically from the one shown in FIG. 7, the methodology of the present invention being applicable to formation of all such heads.

Figure 8:
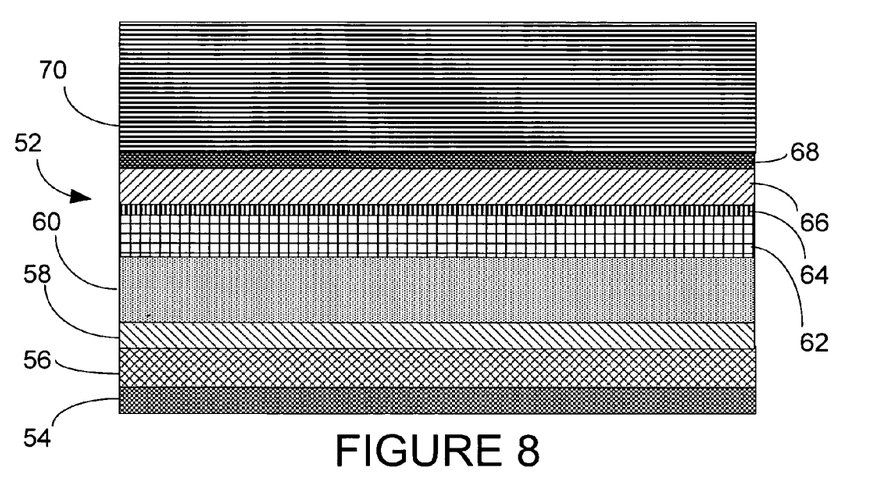

As shown in FIG. 8, a layer of masking material 70 is applied to the wafer stack 52. Note that the layer 70 may be formed of a single layer, a bi-layer, a tri-layer, etc. of one or more materials. This masking material protects underlying material from removal by such processes as ion milling, and can thus be used as a shield or stencil to pattern the underlying material. This masking material consists of a top layer of photoresist or other polymer that can be patterned using photolithography techniques. Suitable resists include i-line, deep UV, and e-beam sensitive resists. The underlying layers (if used) can be polymethylglutarimide (PMGI) available from MicroChem Corp., Duramide, diamond like carbon (DLC), etc. If an underlying material is used, this would be patterned by chemical dissolution or reactive ion etching through the photoresist mask.

Figure 9:
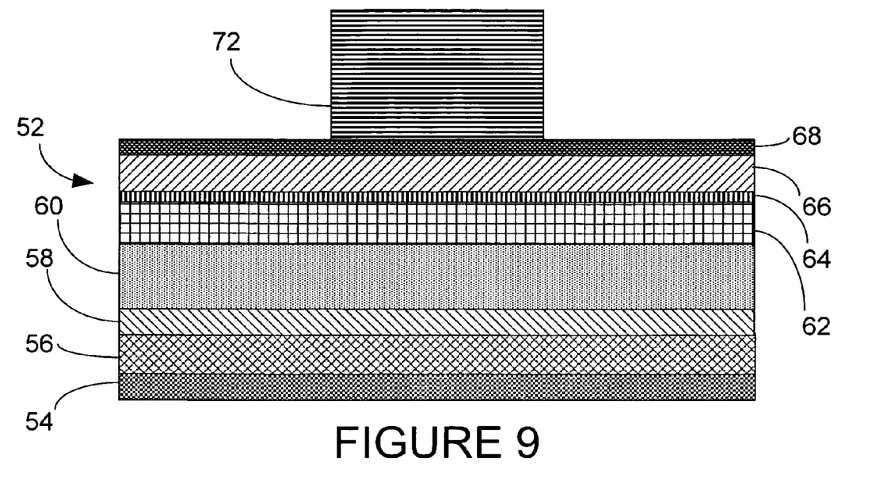

Material is removed from the layer of photoresist 70, as shown in FIG. 9, to form a mask layer 72. Any suitable process, such as photolithograpy or reactive ion etching (RIE), can be used to remove portions of the photoresist 70, to shape it into the mask layer 72. It should be noted that the structure of the mask layer 72 does not have an undercut as discussed above in relation to the prior art, meaning that the width of the mask layer 72 after patterning is substantially constant from top to bottom.

Figure 10:
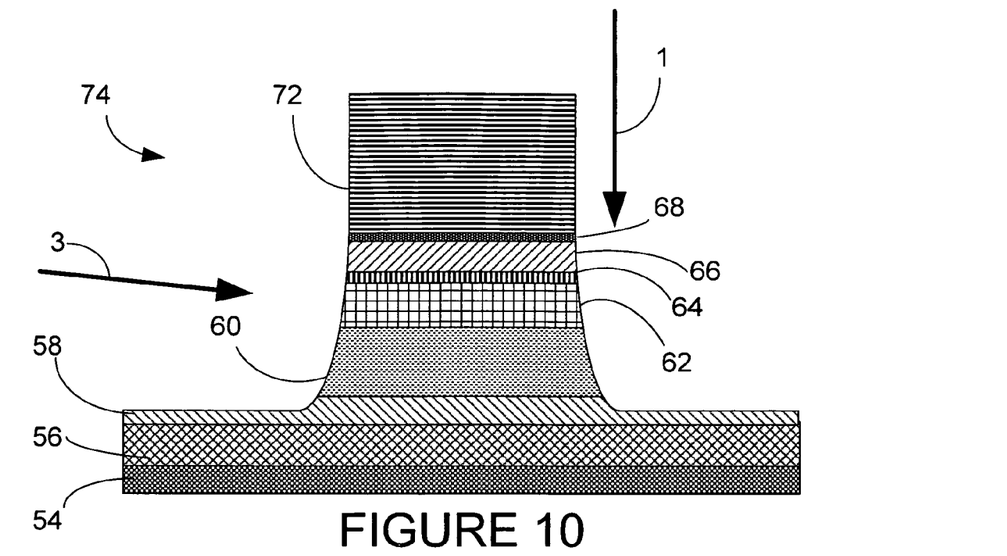

As shown in FIG. 10, the mask layer 72 is used as a mask for ion milling/reactive ion beam etching or sputter etching to remove material of the wafer stack 52 at the exposed areas around the mask layer 72 thus forming a shaped wafer stack 74. To obtain a profile of the shaped wafer stack 74 which is relatively vertical, milling is performed at high incidence, i.e., about 0-25 degrees from normal incidence, preferably about 0-15 degrees from normal incidence, or from another perspective, about 65-90 degrees, preferably about 75-90 degrees from the surface being milled as indicated by direction arrow 1. However, this commonly causes redeposition of material on the sides of the shaped wafer stack 74. To remove redeposited material, the shaped wafer stack 74 is milled at razing incidence, i.e., about 60-90 degrees from normal incidence, preferably about 60-85 degrees from normal incidence, as shown by second direction arrow 3.

These angles provide a milling rate that reduces the top of the wafer stack 52 faster than the side of the wafer stack 52. This is because when the top is milled at less than about 25 degrees from normal incidence, a small amount of the milling affects the sides. At razing incidence, both the top and sides of the wafer stack 52 are milled, with more milling at the sides of the wafer stack 52.

Ideally, alternating milling cycles are performed at normal and razing incidence, or with the milling angle being pivoted between normal and razing incidence. Optionally, milling can be performed at additional angles between normal and razing incidence. Many alternating cycles are preferred, because redeposited material may build up to create a protrusion that causes shadowing.

Figure 11:
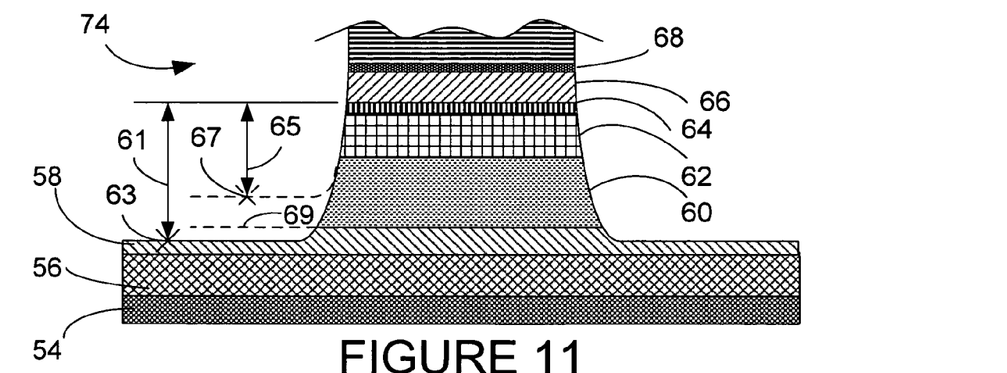

The shaped wafer stack 74 after all milling has been completed is shown in FIG. 11. It should be noted that in this case, the milling has cut though the upper layers through the AFM 60 layer and partially into the first seedlayer 58, but stops before it reaches the dielectric layer 56. Partial milling can be controlled by many different methods, including secondary ion mass spectroscopy, optical emission endpoint monitoring, and also other well-known techniques such as use of a stop layer can be used.

There are several reasons and advantages for using this "partial milling" of the first seed layer 58. First, using partial milling, the thin dielectric layer underneath the sensor does not get damaged by ion milling. This improves manufacturing yields since there is less yield loss due to shorting between the sensor and the bottom shield. Secondly, the amount of material removed is less. There is thus less redeposited material that gets thrown against the sensor during mill processes. This is expected to give cleaner junctions, with lower junction resistance. Also, the total milling time is naturally shorter, and consequently, there is less chance of ESD damage.

Another advantage is that since metal is not completely removed during a partial mill, islands of material are not left behind (unlike in the full mill case, where at the end of the milling process, there are islands of patterned material). Rather, there is a continuous film of material on the wafer at all times. Thus, there is less chance of charge buildup and potential ESD damage.

Additionally, it is possible to stop at different points of the sensor stack (e.g. pinned layer), and achieve junctions of different shapes. Depending on the sensor film characteristics and hard bias/leads characteristics, this is expected to produce different sensor performance based on junction shape.

Also, it is an advantage that only a thin seed layer for the hard bias is required in the partial mill case. In contrast for the full mill, a thick seed layer may be required in order to align the hard bias with the free layer. When depositing this thick layer, the amount of material deposited on the junction is significant. This can potentially increase junction resistance, and also leads to a larger spacing between the hard bias layer and the sensor, which is undesirable.

For all these reasons, partial milling is done into or to a point prior to the first seed layer 58 to produce the structure seen in FIG. 11.

It should be noted that while it is necessary that the free magnetic layer 66 be completely etched, shaping of the other layers between the free layer 66 and the first seed layer 58, is dictated by the junction shape that is desired. More specifically, these layers include the spacer layer 64, the pinned layer 62 and the AFM layer 60. Thus, the term "partial milling" as used for purposes of this application will include milling processes that extend at least through the free magnetic layer 66, but stop short of milling completely through the first seed layer 58.

For this reason, the partial milling operation will be defined to extend within a range designated as the partial milling range 61. One example is having a partial milling depth endpoint 63, which is located within the first seed layer 58, but not extending through to the dielectric layer 56, as seen in FIG. 11. Another example of a partial milling depth 65 within this partial milling range 61 and extending to a depth endpoint 67 is shown in dashed lines also in FIG. 1. This corresponds to a partial milling operation which extends into, but not through, the AFM layer 60. In such a case, the first seed layer 58 will not be reached and its upper surface will continue to form a flat stratum as indicated by dashed line 69.

Figure 12:
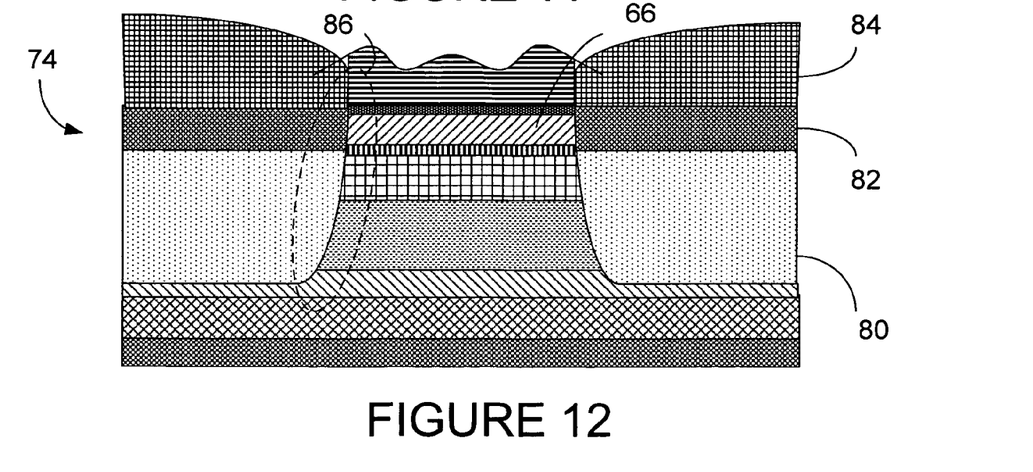

As shown in FIG. 12, next a seedlayer 80 of a suitable material such as Cr, etc. is deposited. A hard bias layer 82 is then added which may include CoPt, CoPtCr, etc., forming a crucial junction 86 with the shaped stack layers 74, especially being in close proximity to the free layer 66. The hard bias layer 82 is used to keep the domains in the free layer 66 in a default alignment so they are not allowed to align randomly. This hard biasing improves magnetic stability and hence the signal to noise performance. A layer of electrical leads 84 is then added upon the hard bias layer 82 using any suitable process, such as sputter deposition.

The photoresist mask 72 stays on after the milling is done, until the hard bias layer 82 and lead layer 84 has been deposited. Then the mask 72 is removed, and in the process, the hard bias and lead layer material that gets deposited on top of the mask 72 gets removed (or "lifted off").

Figure 13:
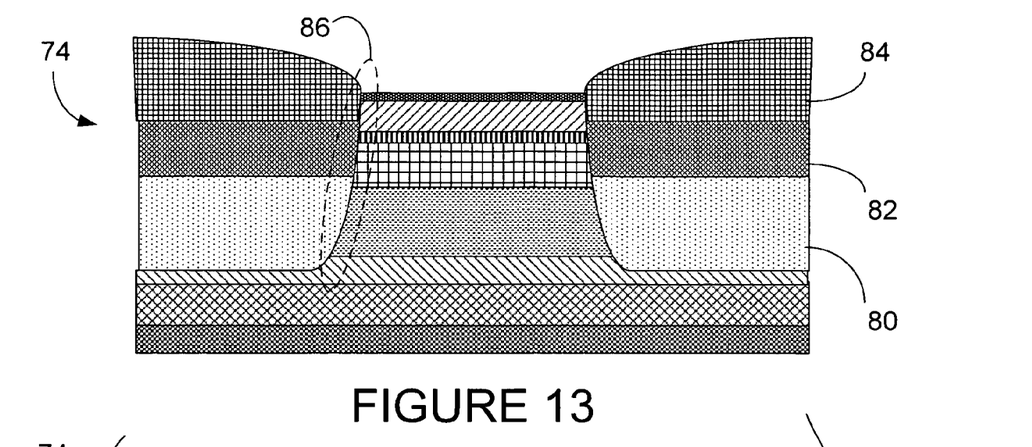
FIGS. 13-15 are front plan views of alternate embodiments of the structure of a CIP read sensor having partial milling of the present invention as seen from the ABS.

Thus, a lift off process is used to remove the photomask 72, leaving the shaped wafer stack 74 shown in FIG. 13.

Additional layers may then be added to the shaped wafer stack 74, such as upper layers of dielectric material (not shown) and a second shield layer (not shown).

Also, optionally, a layer of diamond-like carbon (not shown) can be added if subsequent processing includes Chemical Mechanical Polishing (CMP). The diamond-like carbon will protect the new-formed sensor 50 from damage during the CMP.

Figure 14:
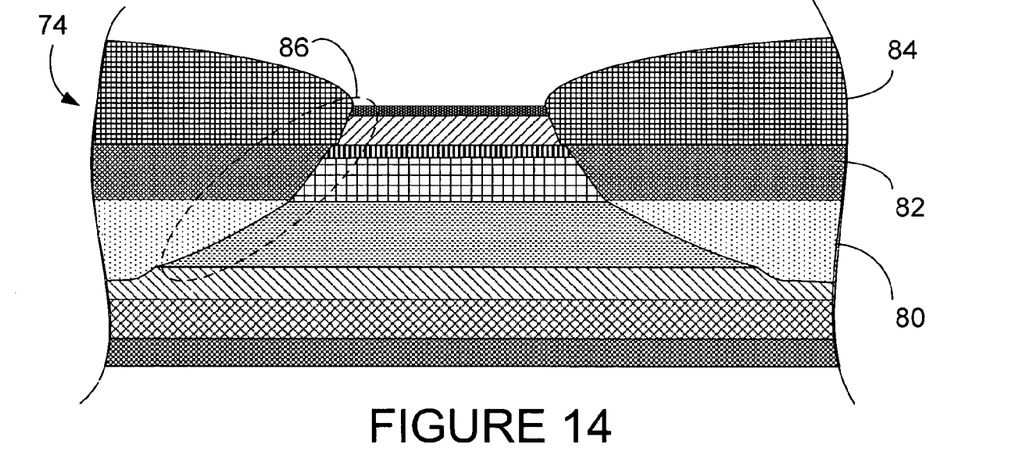
Figure 15:
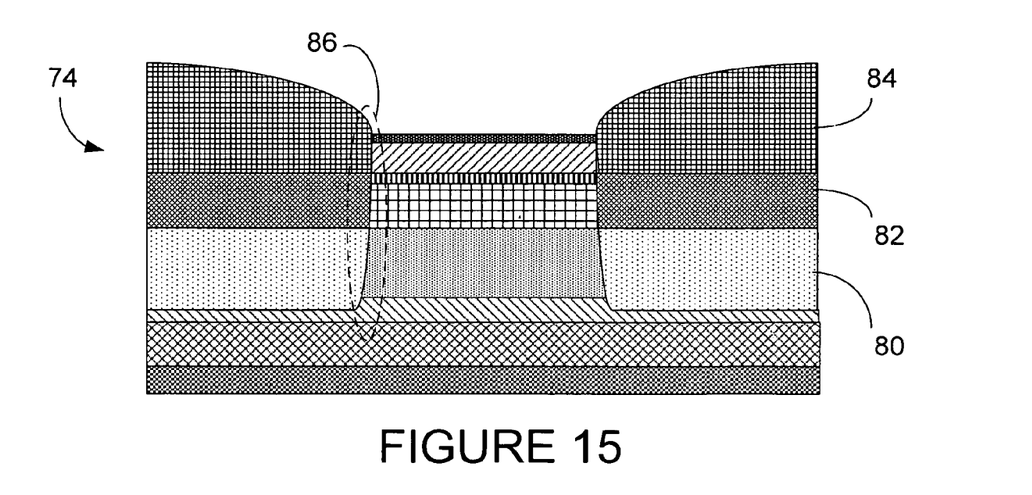

A sharp junction shape can be achieved by ion milling at an angle of 0~15°, as shown in FIG. 13. Ion milling at a shallower angle would give a more sloped junction shape, as shown in FIG. 14. Ion milling at a sharp angle (0~15°) followed by a shallow angle (60~85°) can give a sharper junction, as depicted in FIG. 15. Thus FIGS. 14 and 15 show variations injunction shapes 86 caused by varying the angle of milling so that the side angles of the shaped wafer stack 74 have different slopes. The angles have been exaggerated and are not to be interpreted as limitations on the actual angles achieved. The varying shapes of the junction angles 86 are expected to produce various results in the performance of the read sensor, such as read track width, signal amplitude, magnetic stability, noise performance and signal to noise ratio. However, all of these various junction shapes are expected to exhibit the advantages discussed above in regards to the partial milling of the sensor stack.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for fabricating a read head of a magnetic disk drive, the method comprising:
    A) depositing a first shield layer to begin a wafer stack;
    B) depositing a dielectric layer on said first shield layer;
    C) depositing a first seed layer on said dielectric layer;
    D) depositing an AFM layer on said first seed layer;
    E) depositing at least one pinned layer on said AFM layer;
    F) depositing a spacer layer on said at least one pinned layer;
    G) depositing a free layer on said spacer layer;
    H) depositing a cap layer on said free layer to complete said wafer stack;
    I) depositing a mask layer on said cap layer to mask a portion of said wafer stack; and
    J) partially milling said wafer stack with a milling source to remove material from wafer stack layers to within a partial milling range which extends to a partial milling depth having a depth endpoint to form a shaped junction, where said partial milling depth extends at least through said free magnetic layer, but stops short of milling completely through said first seed layer.

2. The method of fabrication of claim 1, wherein:
    J) includes milling at high incidence.

3. The method of fabrication of claim 2, wherein:
    J) further includes milling at razing incidence.

4. The method of fabrication of claim 3, wherein:
    J) includes multiple cycles of milling at both high incidence and razing incidence.

5. The method of fabrication of claim 4, wherein:
    said mask layer of I has no undercut.

6. The method of fabrication of claim 1, further comprising:
    K) depositing a second seed layer.

7. The method of fabrication of claim 6, further comprising:
    L) depositing a hard bias layer.

8. The method of fabrication of claim 7, further comprising:
    M) lifting off said mask layer.

9. The method of fabrication of claim 8, further comprising:
    N) depositing leads layer.

10. The method of fabrication of claim 7, wherein:
    J) includes shaping portions of said wafer stack so that a junction between said portions of said wafer stack and said hard bias layer forms said shaped junction.

11. The method of fabrication of claim 1, wherein:
    said partial milling range extends from below said free layer to a partial milling depth having a depth endpoint which lies within said first seed layer.

12. The method of fabrication of claim 11, wherein:
    said partial milling depth lies within said partial milling range and where a depth endpoint lies within said AFM layer.

* * * * *